(12) United States Patent
Lee et al.

(10) Patent No.: US 11,342,631 B2
(45) Date of Patent: May 24, 2022

(54) BATTERY MODULE HAVING A BUS BAR WITH A MAIN FRAME AND METAL PLATES

(71) Applicant: LG CHEM, LTD., Seoul (KR)

(72) Inventors: Jung-Hoon Lee, Daejeon (KR); Dal-Mo Kang, Daejeon (KR); Sang-Woo Ryu, Daejeon (KR); Jeong-O Mun, Daejeon (KR); Jin-Yong Park, Daejeon (KR); Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 385 days.

(21) Appl. No.: 16/465,871

(22) PCT Filed: Jan. 5, 2018

(86) PCT No.: PCT/KR2018/000283
§ 371 (c)(1),
(2) Date: May 31, 2019

(87) PCT Pub. No.: WO2018/221818
PCT Pub. Date: Dec. 6, 2018

(65) Prior Publication Data
US 2019/0305284 A1    Oct. 3, 2019

(30) Foreign Application Priority Data

May 29, 2017    (KR) .......................... 10-2017-0066191

(51) Int. Cl.
*H01M 50/50*    (2021.01)
*H01R 4/62*    (2006.01)
(Continued)

(52) U.S. Cl.
CPC ........... *H01M 50/50* (2021.01); *H01M 50/10* (2021.01); *H01M 50/20* (2021.01);
(Continued)

(58) Field of Classification Search
CPC .... H01M 50/502; H01M 50/10; H01M 50/20; H01M 50/50; H01M 50/531;
(Continued)

(56) References Cited

U.S. PATENT DOCUMENTS

2013/0171494 A1*  7/2013  Schaefer ................ B23K 20/04
429/121
2013/0306353 A1    11/2013  Zhao
(Continued)

FOREIGN PATENT DOCUMENTS

CN        104321906 A       1/2015
DE    10 2011 109 238 A1    2/2013
(Continued)

OTHER PUBLICATIONS

Machine translation of KR 1020160115532, Choi et al., 2016 (Year: 2016).*

(Continued)

*Primary Examiner* — Kwang Han
(74) *Attorney, Agent, or Firm* — Birch, Stewart, Kolasch & Birch, LLP

(57) ABSTRACT

A battery module improves electric connection between an electrode lead of a secondary battery and a bus bar. In detail, the battery module includes a plurality of pouch-type secondary batteries; and a bus bar contacted to at least two of first electrode leads and second electrode leads of the secondary batteries, wherein the bus bar includes at least two metal plates contacted and connected to at least two of the first electrode leads and the second electrode leads of at least two secondary batteries; and a main frame coupled to the
(Continued)

metal plates, wherein at least one of the metal plates has a different kind of metal material from a material of the main frame.

14 Claims, 12 Drawing Sheets

(51) Int. Cl.
*H01M 50/502* (2021.01)
*H01M 50/531* (2021.01)
*H01M 50/10* (2021.01)
*H01M 50/20* (2021.01)

(52) U.S. Cl.
CPC ....... *H01M 50/502* (2021.01); *H01M 50/531* (2021.01); *H01R 4/62* (2013.01); *H01M 2220/20* (2013.01)

(58) Field of Classification Search
CPC ... H01M 2220/20; H01M 50/116; H01R 4/62; B60K 6/28; B60L 50/64; B60Y 2200/91; B60Y 2200/92; B60Y 2400/112; Y02E 60/10
See application file for complete search history.

(56) References Cited

U.S. PATENT DOCUMENTS

| | | | |
|---|---|---|---|
| 2013/0309919 A1 | 11/2013 | Oda et al. | |
| 2013/0323549 A1 | 12/2013 | Choi et al. | |
| 2016/0069249 A1 | 3/2016 | Youm et al. | |
| 2016/0293908 A1 | 10/2016 | Lee et al. | |
| 2017/0125774 A1 | 5/2017 | Choi et al. | |
| 2018/0040389 A1 | 2/2018 | Matsunaga et al. | |
| 2018/0301667 A1* | 10/2018 | Nakai | H01M 50/557 |

FOREIGN PATENT DOCUMENTS

| | | | | |
|---|---|---|---|---|
| JP | 2008-137059 A | | 6/2008 | |
| JP | 2013-524417 A | | 6/2013 | |
| JP | 2014-22195 A | | 2/2014 | |
| JP | 5910790 B1 | | 4/2016 | |
| KR | 10-1148183 B1 | | 5/2012 | |
| KR | 10-2012-0081821 A | | 7/2012 | |
| KR | 10-2013-0016423 A | | 2/2013 | |
| KR | 10-2013-0049984 A | | 5/2013 | |
| KR | 10-2015-0110078 A | | 10/2015 | |
| KR | 10-2015-0113827 A | | 10/2015 | |
| KR | 10-1637638 B1 | | 7/2016 | |
| KR | 10-2016-0119518 A | | 10/2016 | |
| KR | 1020160115532 | * | 10/2016 | .......... H01M 50/531 |
| KR | 10-2016-0138810 A | | 12/2016 | |
| KR | 10-2017-0050508 A | | 5/2017 | |
| KR | 10-2017-0056877 A | | 5/2017 | |
| WO | WO 2013/051012 A2 | | 4/2013 | |

OTHER PUBLICATIONS

International Search Report issued in PCT/KR2018/000283, dated Aug. 20, 2018.

* cited by examiner

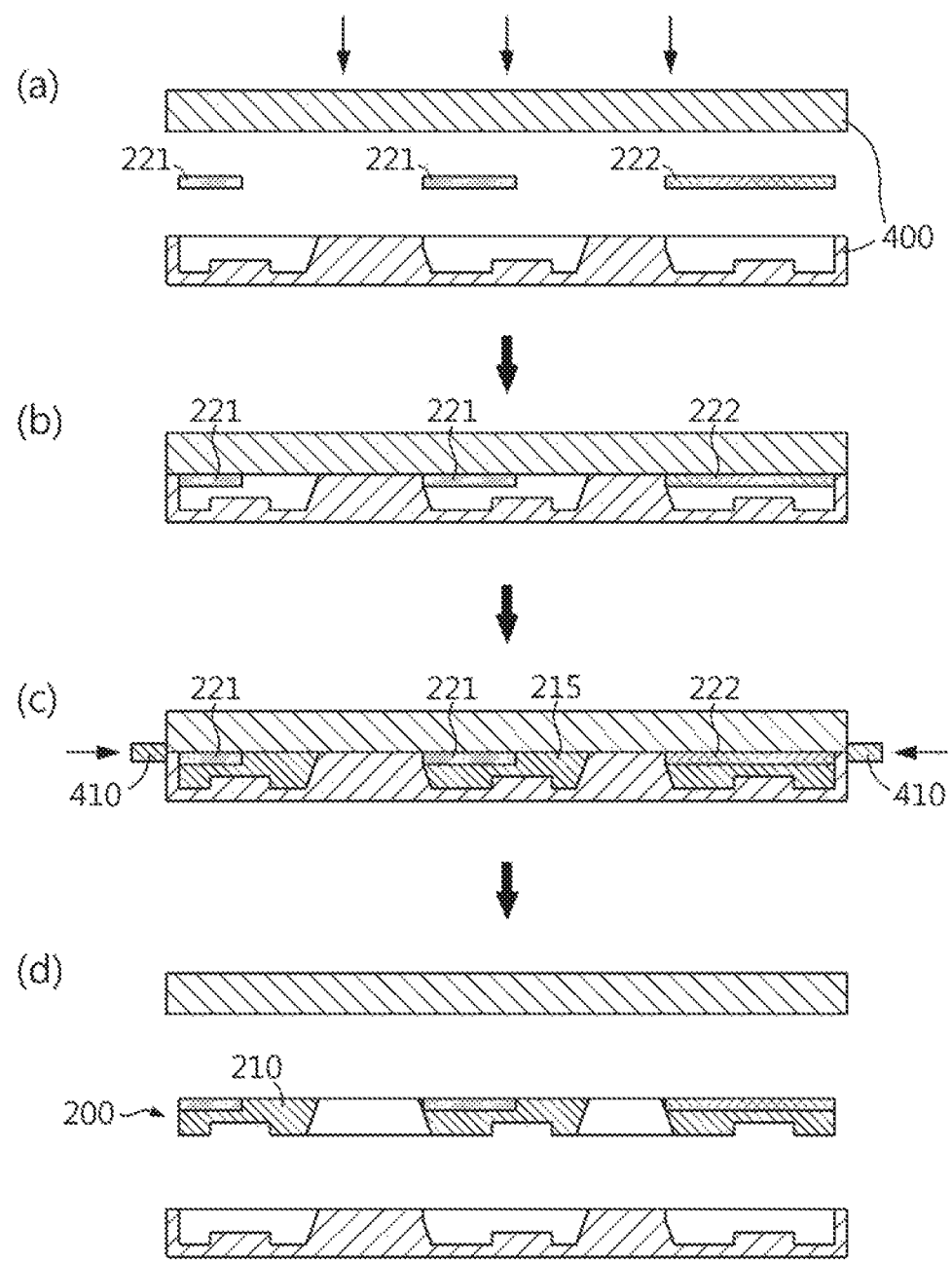

BATTERY MODULE HAVING A BUS BAR WITH A MAIN FRAME AND METAL PLATES

TECHNICAL FIELD

The present disclosure relates to a battery module accommodating two or more secondary batteries, and more particularly, to a battery module having more reliable electric connection at a connection 11. portion between an electrode lead of a secondary battery and a bus bar, and a battery pack and a vehicle including the battery module.

The present application claims priority to Korean Patent Application No. 10-2017-0066191 filed on May 29, 2017 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a pouch exterior, sealably containing the electrode assembly together with an electrolyte.

Generally, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, pouch-type secondary batteries are widely used for the middle-sized or large-sized devices since they may be easily stacked.

In order to electrically connect the secondary batteries inside a battery module, electrode leads are connected to each other, and the connection portions may be welded to maintain the connected state. Further, the battery module may have parallel and/or series electrical connections between the secondary batteries. For this, one end of the electrode lead may be fixed in contact to the bus bar by welding or the like for electrical connection between to each secondary battery.

In this configuration, the electric connection between the electrode lead and the bus bar should be reliably secured in order to avoid disconnection as much as possible. However, if the metal of the electrode lead of the secondary battery and the metal of the bus bar connected to the electrode lead are different materials, the welding performance may be deteriorated since there is a welding region where different kinds of metals are welded. In particular, a battery module used in medium-sized or large-sized devices such as electric vehicles requires high output characteristics, and thus the electrode lead and/or bus bar may be easily heated to high temperature. At this time, if the temperature of the electrode lead and the bus bar exceeds a proper level, the welding force between the electrode lead and the bus bar is weakened, or the shape of these components is deformed, thereby further increasing the risk of breaking the electrical connection therebetween.

In addition, when a bus bar used in a conventional battery pack is manufactured using a pressing process, it is difficult to realize a complicated shape of the bus bar. For this reason, there is a limitation in implementing a bus bar having various functions, and also it is not possible to reduce the weight in order to optimize the weight of the bus bar.

Moreover, when the bus bar is manufactured using a casting process, pores are easily generated inside the bus bar. Thus, when a laser welding process is performed to connect the electrode lead and the bus bar, breakage or disconnection may occur due to the pores inside the bus bar, and thus it is difficult to apply the laser welding.

DISCLOSURE

Technical Problem

The present disclosure is designed to solve the problems of the related art, and therefore the present disclosure is directed to providing a battery module, which includes a bus bar capable of stably ensuring reliable coupling and electric connection at a portion where an electrode lead of a secondary battery and a bus bar are connected, and a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a plurality of pouch-type secondary batteries configured to respectively have a first electrode lead and a second electrode lead and arranged to be stacked in at least one direction; and a bus bar made of an electrically conductive material and contacted to at least two of the first and second electrode leads of the secondary batteries to electrically connect the secondary batteries to each other.

Here, the bus bar includes at least two metal plates contacted and connected to at least two of the first electrode leads and the second electrode leads of at least two secondary batteries; and a main frame coupled to the metal plates so that the metal plates are at least partially exposed to the outside.

In addition, at least one of the metal plates may have a different kind of metal material from a material of the main frame.

Further, the metal plates may include a first metal plate contacted and connected to the first electrode lead of at least one secondary battery; and a second metal plate contacted and connected to the second electrode lead of at least one secondary battery.

In addition, the first metal plate may be made of a same material as the first electrode lead of the secondary battery to which the first metal plate is contacted and connected, and the second metal plate may be made of a same material as the second electrode lead of the secondary battery to which the second metal plate is contacted and connected.

Also, the first metal plate, the second metal plate or the main frame may include nickel, copper, aluminum, lead or tin.

Further, a placing portion recessed with a size corresponding to the first metal plate or the second metal plate may be formed at a front surface of the main frame.

In addition, an outwardly exposed front surface of the first metal plate or the second metal plate may be recessed to a rear, based on the front surface of the main frame, and is exposed to the outside.

Also, the first metal plate or the second metal plate may be configured such that a portion of a front surface, a rear surface and at least a portion of a side surface of the first metal plate and the second metal plate are in contact with the placing portion of the main frame.

Further, the first metal plate and the second metal plate may have a plate form standing in an upper and lower direction, and the first metal plate and the second metal plate may be inserted into the placing portion to cover a front surface, a rear surface and a side surface of at least one of a top end, a bottom end and a side end of the first metal plate and the second metal plate, respectively.

In addition, the first metal plate and the second metal plate may be shaped by means of plastic working, and the main frame may be formed by casting so that the placing portion, the first metal plate and the second metal plate are closely adhered to each other.

Also, a portion of the first metal plate closely adhered to the placing portion of the main frame may be melted and bonded to the main frame in a state where the metal of the first metal plate and a metal of the main frame are mixed, and a portion of the second metal plate closely adhered to the placing portion of the main frame may be melted and bonded to the main frame in a state where the metal of the second metal plate and the metal of the main frame are mixed.

Meanwhile, the main frame may have a plurality of holes formed therein so that the first electrode lead and the second electrode lead are respectively inserted therethrough.

Further, the holes may be formed in contact with one side of the first metal plate and the second metal plate, respectively.

In addition, at least one recessed portion recessed to the front of the main frame may be formed at a rear surface of the main frame.

In another aspect of the present disclosure, there is also provided a method for manufacturing a bus bar, comprising: (a) preparing a first metal plate and a second metal plate shaped by plastic working using a press; (b) mounting and fixing the first metal plate and the second metal plate in a mold; and (c) injecting a molten metal into the mold so as to be coupled to at least a portion of the first metal plate and the second metal plate and solidifying the molten metal to cast a main frame.

Further, at least one of the first metal plate and the second metal plate may have a different kind of metal material from a material of the main frame.

In another aspect of the present disclosure, there is also provided a battery pack, comprising a battery module according to the present disclosure.

In another aspect of the present disclosure, there is also provided a vehicle, comprising a battery pack according to the present disclosure.

In another aspect of the present disclosure, there is also provided a bus bar, which is in contact with at least two of first electrode leads and second electrode leads of secondary batteries to electrically connect the secondary batteries.

Further, the bus bar may comprise at least two metal plates contacted and connected to at least two of the first electrode leads and the second electrode leads of at least one secondary battery; and a main frame coupled to the metal plate so that the metal plate is at least partially exposed to the outside.

In addition, at least one of the metal plates may have a different kind of metal material from a material of the main frame.

In detail, the metal plates may include a first metal plate contacted and connected to the first electrode lead of at least one secondary battery; and a second metal plate contacted and connected to the second electrode lead of at least one secondary battery.

Also, the first metal plate may be made of the same material as the first electrode lead of the secondary battery to which the first metal plate is contacted and connected, and the second metal plate may be made of the same material as the second electrode lead of the secondary battery to which the second metal plate is contacted and connected.

Further, at least one of the first metal plate and the second metal plate may have a different kind of metal material from the main frame.

In another aspect of the present disclosure, there is also provided a bus bar for a battery pack, which is contacted to at least two of first external input/output terminals and second external input/output terminals of battery modules to electrically connect the battery modules, the bus bar comprising a first metal plate contacted and connected to the first external input/output terminal of at least one battery module; a second metal plate contacted and connected to the second external input/output terminal of at least one battery module; and a main frame coupled to the first metal plate and the second metal plate so that at least a portion of the first metal plate and at least a portion of the second metal plate are exposed to the outside.

Also, at least one of the first metal plate and the second metal plate may have a different kind of metal material from the main frame.

Advantageous Effects

According to an embodiment of the present disclosure, since at least one of the metal plates of the bus bar has a different kind of metal material from the main frame and thus may be coupled by using the same metal to the electrode lead made of a different kind of metal material from the main frame. Thus, it is possible to prevent the bonding reliability and the bonding force between them from being deteriorated due to the bonding between different kinds of metals.

Thus, according to the embodiment of the present disclosure, it is possible to prevent that the battery module is not capable of being charged or discharged or its output or capacity is deteriorated since the connection between the electrode lead and the bus bar is cut off due to the poor coupling between the bus bar and the electrode lead.

In addition, according to an embodiment of the present disclosure, the laser welding method may be easily applied for contacting between the metal plate and the electrode lead, thereby improving the efficiency of the welding work.

Further, according to an embodiment of the present disclosure, since the bus bar may be prepared in various shapes, it is possible to prevent the bus bar installed at the battery module from being interfered with by an external object and to make a compact battery module by enhancing the space utilization of components.

In addition, according to an embodiment of the present disclosure, the bus bar may be manufactured in various shapes, and thus it is possible to prevent the bus bar installed at the battery module from interfering with an external object, and also a compact battery module may be obtained by enhancing the space efficiency of components.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 14 is a schematic front sectioned view for illustrating an example of a method for manufacturing a bus bar of the battery module according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
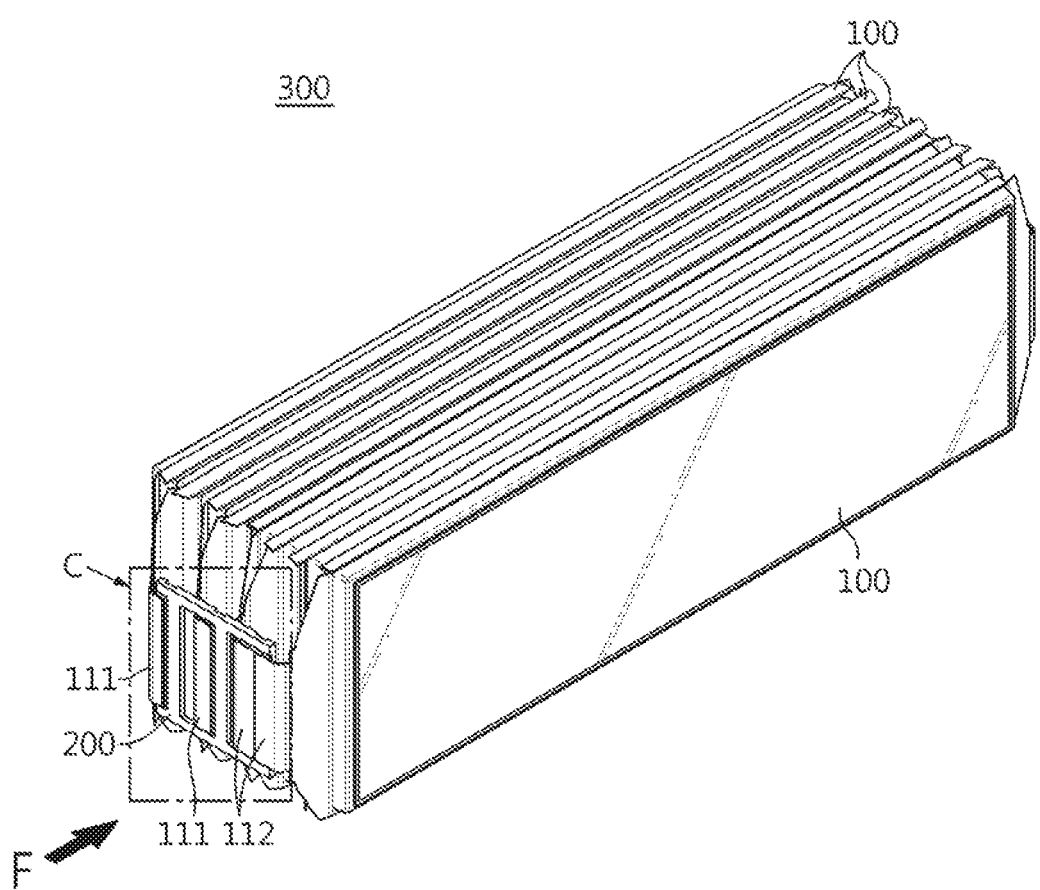
FIG. 1 is a perspective view schematically showing components of a battery module according to an embodiment of the present disclosure.
Figure 2:
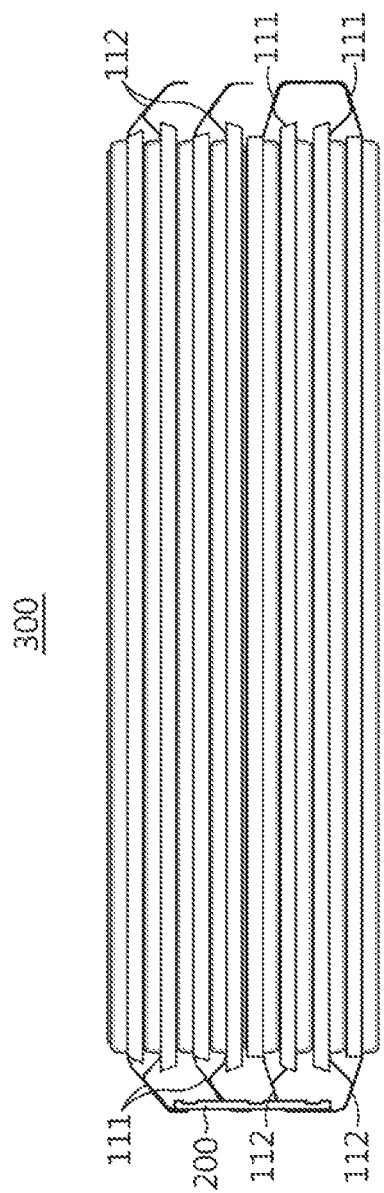
FIG. 2 is a plane view schematically showing components of the battery module according to an embodiment of the present disclosure.
Figure 3:
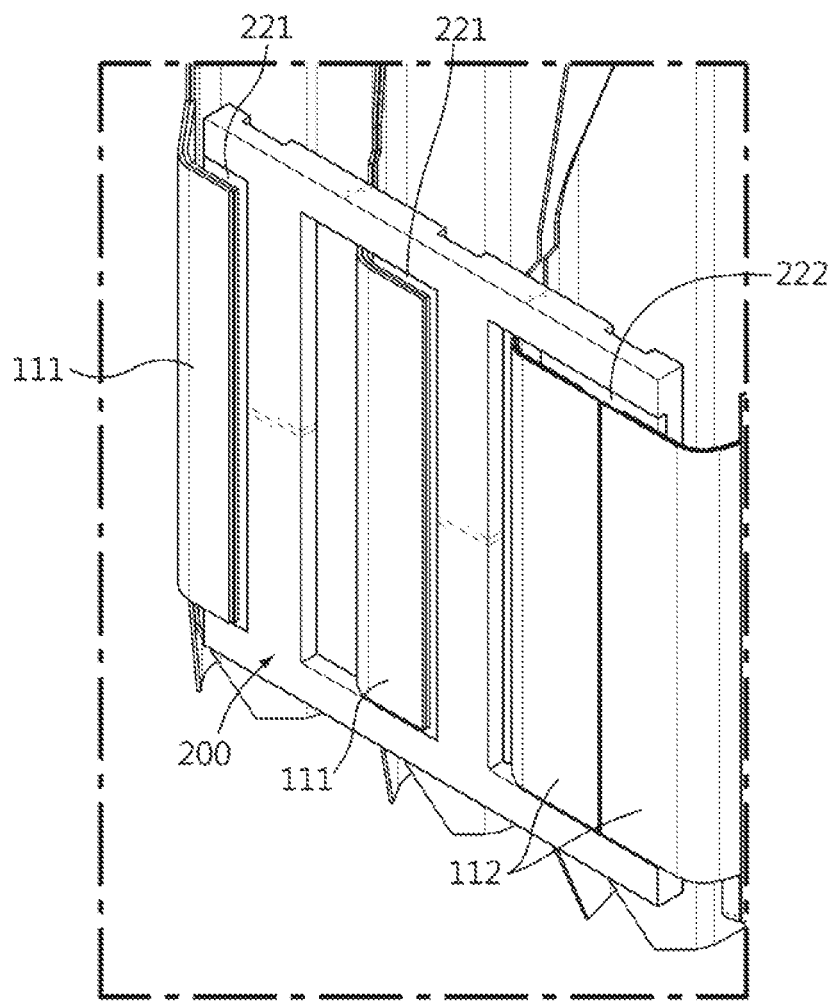
FIG. 3 is an enlarged perspective view showing a portion C of the battery module of FIG. 1.

FIG. 1 is a perspective view schematically showing components of a battery module according to an embodiment of the present disclosure. FIG. 2 is a plane view schematically showing components of the battery module according to an embodiment of the present disclosure. FIG. 3 is an enlarged perspective view showing a portion C of the battery module of FIG. 1.

Referring to FIGS. 1 to 3, a battery module 300 according to the present disclosure may include a plurality of secondary batteries 100 and bus bars 200.

Here, the secondary battery 100 may be a pouch-type secondary battery 100. In particular, the pouch-type secondary battery 100 may include an electrode assembly, an electrolyte and a pouch.

Here, the pouch may be composed of two pouches, namely a left pouch and a right pouch, each having a concave accommodation portion. In addition, each pouch includes an outer insulating layer, a metal layer and an inner adhesive layer, and the inner adhesive layer is fused to each other at an edge of the pouch to form a sealing portion. Also, an electrode assembly and an electrolyte may be accommodated in the accommodation portion.

In addition, the electrode assembly is an assembly of electrodes and a separator, and may be configured such that at least one positive electrode plate and at least one negative electrode plate are disposed with a separator interposed therebetween. Also, a first electrode plate of the electrode assembly includes a first electrode tab, and at least one first electrode tab may be connected to a first electrode lead 111. Here, the first electrode lead 111 has one end connected to the first electrode tab and the other end exposed out of the pouch, and the exposed portion may serve as an electrode terminal of the secondary battery, for example a positive electrode terminal of the secondary battery 100.

Also, a second electrode plate of the electrode assembly includes a second electrode tab, and at least one second electrode tab may be connected to a second electrode lead 112. The second electrode lead 112 has one end connected to the second electrode tab and the other end exposed out of the pouch, and the exposed portion may serve as an electrode terminal of the secondary battery, for example a negative electrode terminal of the secondary battery 100.

At this time, the first electrode tab and the second electrode tab of the secondary battery 100 may be a positive electrode tab or a negative electrode tab, and also the first electrode lead 111 and the second electrode lead 112 may be a positive electrode lead or a negative electrode lead. Further, the first electrode lead 111 and the second electrode lead 112 may be electrode leads with different polarities. For example, the first electrode lead 111 may be a positive electrode lead, and the second electrode lead 112 may be a negative electrode lead.

Moreover, the positive electrode lead and negative electrode lead may be provided in opposite directions, based on the center of the secondary battery 100. For example, as shown in FIGS. 1 and 2, each secondary battery 100 may be configured such that the first electrode lead 111 and the second electrode lead 112 protrude forward and backward. Thus, according to this configuration of the present disclosure, in one secondary battery 100, there is no interference between the positive electrode lead and the negative electrode lead, thereby widening the area of the electrode lead. In addition, a welding process between the electrode leads and a welding process between the electrode lead and the bus bar 200 may be performed more easily.

Also, the first electrode lead 111 and the second electrode lead 112 may be configured in a plate form. In particular, the first electrode lead 111 and the second electrode lead 112 may protrude in a horizontal direction in a state of standing so that its broad surfaces are oriented to left and right sides, and then an end thereof may be bent in the left or right direction. In particular, as shown in FIG. 3, if the electrode leads 112 of the secondary batteries 100 adjacent to each other have different bent directions, the electrode leads 112 may be configured such that their ends face each other.

A plurality of pouch-type secondary batteries 100 may be included in the battery module 300 and arranged to be stacked in at least one direction. For example, as shown in FIGS. 1 and 2, a plurality of pouch-type secondary batteries 100 may be stacked in a horizontal direction. At this time case, each pouch-type secondary battery 100 may be disposed to stand approximately perpendicular to the ground, when being observed in the F direction (see FIG. 1), such that two broad surfaces are located at right and left sides, respectively, and the sealing portions are located at upper, lower, front and rear sides. In other words, each secondary battery 100 may be configured to stand in an upper and lower direction. Meanwhile, in the specification, the terms indicating directions such as front, rear, left, right, upper and lower directions are based on the F direction, unless stated otherwise.

The configuration of the pouch-type secondary battery 100 described above is obvious to those skilled in the art and thus is not described in detail. In addition, the battery module 300 according to the present disclosure may employ various secondary batteries known at the time of filing of this application.

Meanwhile, the bus bar 200 may be made of an electrically conductive material with relatively high electrical conductivity. Thus, the bus bar 200 configured as above may be in contact with at least two of the first electrode leads 111 and the second electrode leads 112 of the secondary batteries 100 to electrically connect the secondary batteries 100.

For example, the bus bar 200 may be in contact with electrode leads of the same polarity, for example two or more first electrode leads 111, to electrically connect the secondary batteries 100, or may be in contact with two or more second electrode leads 112 to electrically connect the secondary batteries 100. Alternatively, the bus bar 200 may be in contact with electrode leads of different polarities, for example one or more first electrode leads 111 and one or more second electrode leads 112, to electrically connect the secondary batteries 100.

Moreover, the bus bar 200 may include at least two metal plates 221, 222 for contacting and connecting the electrode leads of the secondary batteries 100. More specifically, the metal plates 221, 222 may be in contact with at least two of the first electrode leads 111 or the second electrode leads 112 of the secondary batteries 100.

In particular, among the metal plates 221, 222, the metal plate 221 may be in contact with the first electrode leads 111 of at least two secondary batteries 100, or the metal plate 222 may be in contact with the second electrode leads 112 of at least two secondary batteries 100. Thus, according to this configuration of the present application, by using the metal plates, the bus bar 200 may come into contact with at least two electrode leads of the same polarity among the first electrode leads 111 or the second electrode leads 112 of the secondary batteries 100 to electrically connect the secondary batteries 100 in parallel.

In addition, the bus bar 200 may include a main frame 210 coupled to the metal plates such that the metal plates 221 are at least partially exposed to the outside. At this time, the exposed portion of the metal plate may be at least a portion of the front surface and the side surface. In addition, the main frame 210 may be made of an electrically conductive material.

Meanwhile, in a conventional bus bar, when the bus bar is made of a material different from the metal material of the electrode lead, it is inevitable that different kinds of metals are coupled between the electrode lead and the bus bar, and thus the reliability of welding between the bus bar and the electrode lead is deteriorated.

In order to solve the problems of the prior art, the bus bar 200 according to an embodiment of the present disclosure includes at least two metal plates 221, and at least one of the metal plates 221 may have a different kind of metal material from the main frame 210.

Here, the metal material may be a single metal material or a metal material formed by a specific combination of different kinds of metals.

More specifically, any one of the metal plates 221 may have the same kind of metal material as the bus bar 200, and the other may include a different kind of metal material different from the bus bar 200, or all the metal plates 221 may include a different kind of metal material from the bus bar 200. Thus, according to this configuration of the present disclosure, since the bus bar 200 includes the metal plate 221 having a different kind of metal material from the main frame 210, it is possible to prevent that so that different kinds of metals are coupled when the bus bar 200 is coupled to the electrode lead made of a different kind of metal material from the main frame 210.

Further, the bus bar 200 according to an embodiment of the present disclosure may include a first metal plate 221 and a second metal plate 222. More specifically, the first metal plate 221 may be contacted and connected to the first electrode lead 111 of at least one secondary battery 100, and the second metal plate 222 may be contacted and connected to the second electrode lead 112 of at least one secondary battery 100.

In particular, the bus bar 200 may be in contact with electrode leads of the secondary batteries 100 with different polarities by using the first metal plate 221 and the second metal plate 222 to electrically connect the secondary batteries 100 in series. In particular, the first metal plate 221 and the second metal plate 222 may be in contact with the first electrode lead 111 and the second electrode lead 112 to electrically connect the secondary batteries 100 of different polarities in series. Accordingly, the bus bar 200 according to an embodiment of the present disclosure may electrically connect the secondary batteries 100 in series by means of the first metal plate 221 and the second metal plate 222. For example, as shown in FIG. 3, the bus bar 200 may include two first metal plates 221 contacted and connected to the first electrode lead 111 and one second metal plate 222 contacted and connected to the second electrode lead 112.

At this time, the first metal plate 221 and the second metal plate 222 may have a plate form. Thus, the first metal plate 221 and the second metal plate 222 may be in surface contact with the electrode leads having a plate form, and thus the contact area may be widened to effectively reduce the electrical resistance of the contact region.

Further, the first metal plate 221 and the second metal plate 222 may be contacted and connected such that the plurality of first electrode leads 111 or the plurality of second electrode leads 112 partially overlap with each other. More specifically, one surface of one end of the first electrode lead 111 may overlap with the other surface of one end of another first electrode lead 111, and one surface of any one of the first electrode leads 111 may be contacted and connected to the first metal plate 221.

Similarly, one surface of one end of the second electrode lead 112 may overlap with the other surface of one end of another second electrode lead 112, and one surface of any one of the second electrode leads 112 may be contacted and connected to the second metal plate 222.

For example, as shown in FIGS. 2 and 3, the first metal plate 221 may be contacted and connected to the first electrode leads 111 in a state where two first electrode leads 111 partially overlap with each other. Also, the second metal plate 222 may be contacted and connected to the second electrode leads 112 in a state where two second electrode leads 112 partially overlap with each other.

Also, a portion of the front surface of the first metal plate 221 and the second metal plate 222 may be connected in surface contact to at least one electrode lead. Further, a portion of the front surface and the side surface of the first metal plate 221 and the second metal plate 222 may be contacted and connected to the electrode lead to increase the contact area with the electrode lead.

In another embodiment, a portion of the front surface of the first metal plate 221 and the second metal plate 222 may be connected in surface contact to two or more electrode leads. More specifically, a portion of the front surface of the first metal plate 221 and the second metal plate 222 may be connected in surface contact to one electrode lead, and the other region except for the portion surface-contacted to the electrode lead may be connected in surface contact to another electrode lead.

In particular, when the second electrode leads 112 of the adjacent secondary batteries 100 are bent in different directions, the front surface of the second metal plate 222 may be connected in surface contact to the second electrode leads 112 in a state where the ends of the second electrode leads 112 face each other.

For example, as shown in FIG. 3, four second electrode leads 112 in total may be connected in surface contact to the second metal plate 222 so that their ends face each other, in a state where two second electrode leads 112 overlap with each other, respectively. According to this configuration of the present disclosure, the bus bar 200 including the first metal plate 221 and the second metal plate 222 may be connected in surface contact to the electrode leads over a large area, and thus it is possible to effectively reduce the electric resistance that may occur in the connection region.

Figure 4:
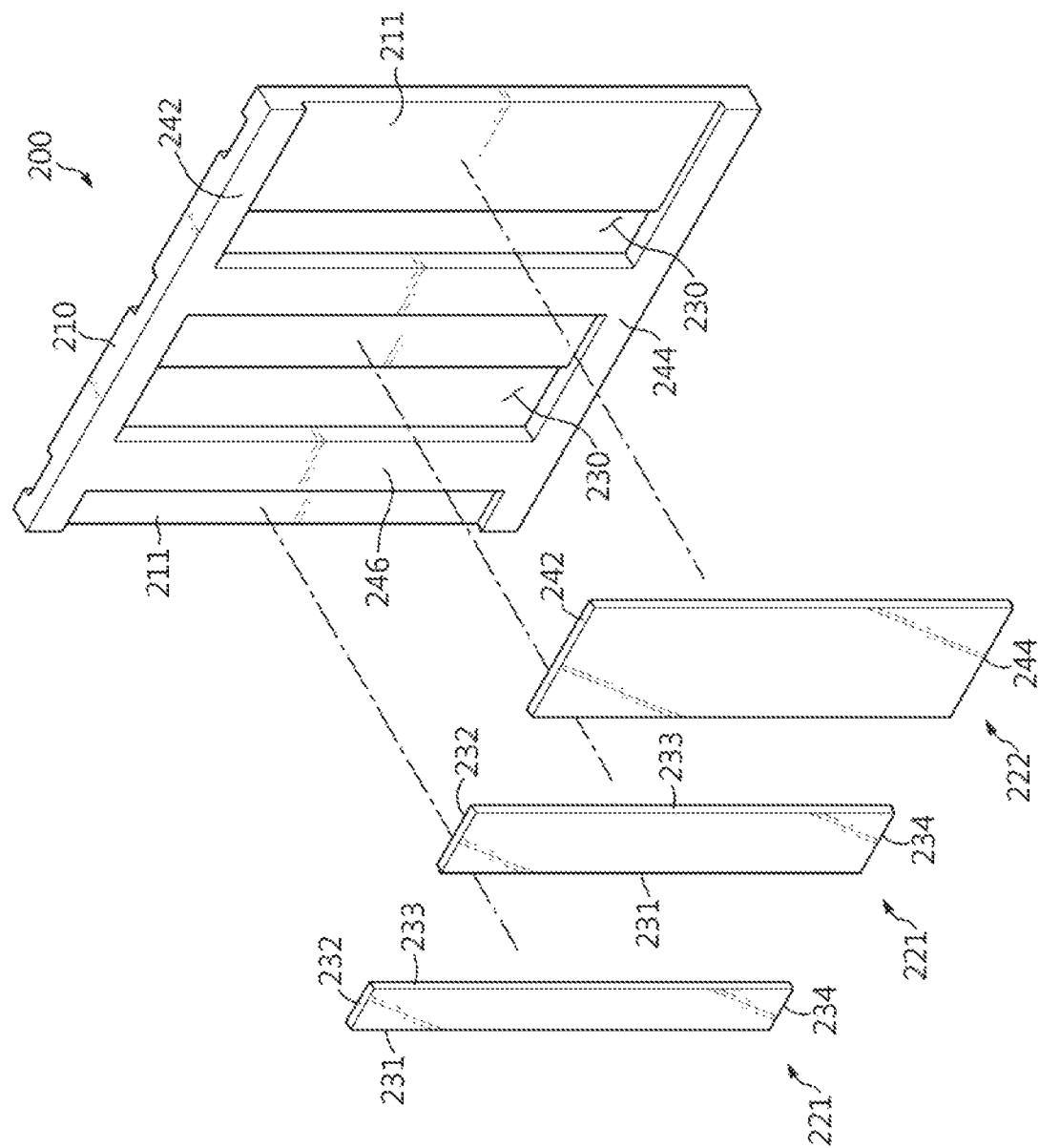
FIG. 4 is an exploded perspective view showing various components of a bus bar employed at the battery module of FIG. 1.

FIG. 4 is an exploded perspective view showing various components of a bus bar employed at the battery module of FIG. 1.

Referring to FIG. 4, the main frame 210 may include a top bar 242, a bottom bar 244 and a connection portion 246.

When the main frame 210 stands in the upper and lower direction, the top bar 242 may have a bar shape located at an upper portion of the main frame 210 and extending in a horizontal direction.

Also, the bottom bar 244 may have a bar shape located at a lower portion of the main frame 210 and extending in a horizontal direction.

The connection portion 246 may be configured to connect the top bar 242 and the bottom bar 244. More specifically, the connection portion 246 may have a rib shape extending from the top bar 242 in a lower direction and connected to the bottom bar 244. Further, at least two connection portions 246 may be formed according to the number of the first metal plates 221 and the second metal plates 222 included in the bus bar 200.

In addition, the first metal plate 221 may be made of the same material as the first electrode lead 111 of the secondary battery 100, which is contacted and connected thereto. In addition, the second metal plate 222 may be made of the same material as the second electrode lead 112 of the secondary battery 100, which is contacted and connected thereto. Here, the material of the first electrode lead 111 and the second electrode lead 112 may be a metal with excellent electrical conductivity, generally the metal used for the electrode lead of the secondary battery 100.

Thus, in the bus bar 200 according to an embodiment of the present disclosure, the first metal plate 221 and the second metal plate 222 are made of the same material as the electrode leads contacted and connected thereto, and so it is possible to avoid that different kinds of metals are coupled when the bus bar 200 and the electrode lead are welded, thereby improving the bonding strength and bonding reliability between the bus bar and the electrode lead.

Meanwhile, the first metal plate 221, the second metal plate 222 and the main frame 210 are components included in the bus bar 200 and may include a metal material to have electrical conductivity.

Specifically, the first metal plate 221 may be made of at least one electrically conductive material selected from the group consisting of, for example, nickel, copper, aluminum, lead and tin. For example, the first metal plate 221 may be an aluminum material. However, the present disclosure is not necessarily limited thereto, and various metals may also be used as the material of the first metal plate 221.

In addition, the second metal plate 222 may also be made of at least one electrically conductive material selected from the group consisting of, for example, nickel, copper, aluminum, lead and tin. For example, the second metal plate 222 may be a copper material. However, the present disclosure is not necessarily limited thereto, and various metals may also be used as the material of the second metal plate 222.

Generally, since the positive electrode lead and the negative electrode lead of the secondary battery are set to be made of different kinds of materials, preferably, the bus bar 200 of the present disclosure may include a first metal plate 221 and a second metal plate 222 made of different kinds of material. For example, if the first metal plate 221 is made of an aluminum material, the second metal plate 222 may be made of a copper material.

Also, the main frame 210 may be made of at least one electrically conductive material selected from the group consisting of nickel, copper, aluminum, lead and tin. For example, the main frame 210 may be a copper material. However, the present disclosure is not necessarily limited to this, and various metals may also be used as the material of the main frame 210.

Further, the main frame 210 may be made of the same material as any one of the first metal plate 221 and the second metal plate 222, and may be made of a material different from the other thereof. For example, the main frame 210 may be made of a copper material like the second metal plate 222, and the first metal plate 221 may be made of an aluminum material.

Figure 5:
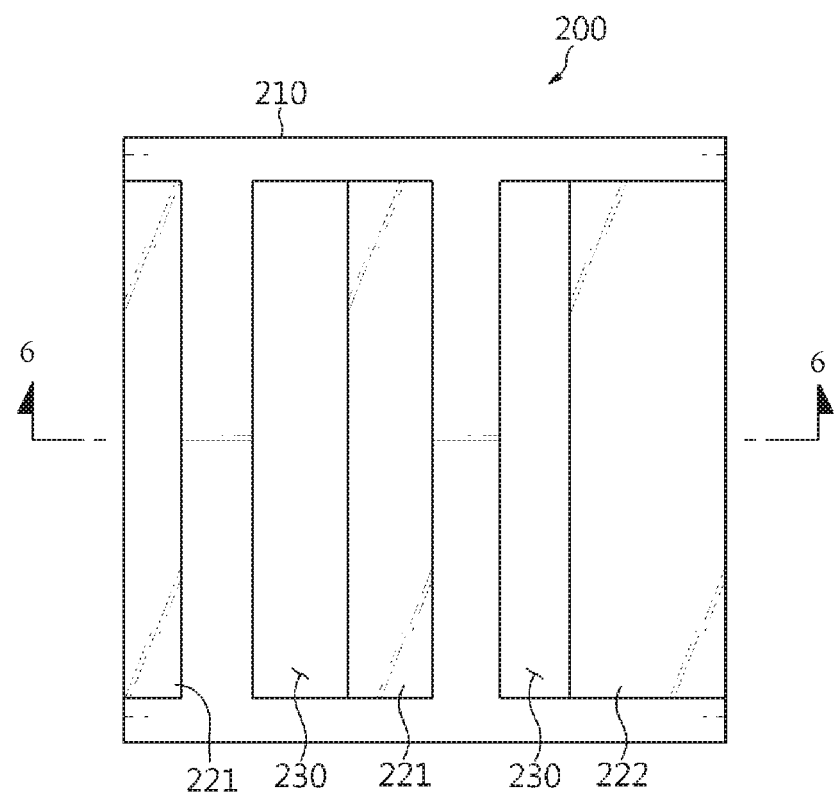
FIG. 5 is a front view showing an example of the bus bar of FIG. 4.

FIG. 5 is a front view showing an example of the bus bar of FIG. 4. In addition, FIG. 6 is a cross-sectioned view showing an example of the cross section, taken along the line 6-6 of FIG. 5.

Figure 6:
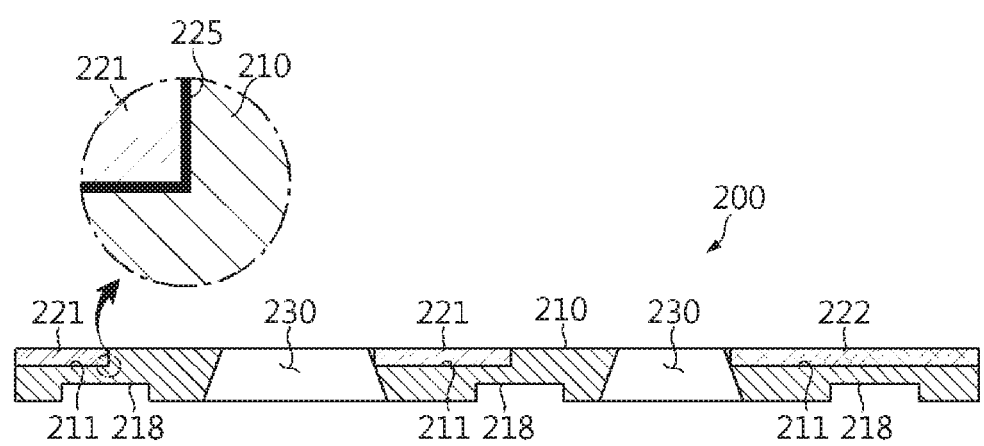
FIG. 6 is a cross-sectioned view showing an example of the cross section, taken along the line 6-6 of FIG. 5.

Referring to FIGS. 5 and 6 along with FIG. 4, the main frame 210 may have a placing portion 211 for mounting the first metal plate 221 or the second metal plate 222 on the front surface thereof. For example, the placing portion 211 may be formed in the main frame 210 with a recessed structure in a size corresponding to the first metal plate 221 or the second metal plate 222 so as to be closely adhered to the outer surface of the first metal plate 221 or the second metal plate 222.

Thus, according to this configuration of the present disclosure, the first metal plate 221 and the second metal plate 222 of the bus bar 200 may be stably mounted on the placing portion 211 of the main frame 210, and thus it is possible to facilitate the contact connection work between the electrode lead and the metal plate. In addition, according to this configuration, the first metal plate 221 and the second metal plate 222 are not easily deviated from the bus bar 200 due to an external impact, and thus it is possible to improve the durability of the bus bar 200.

More specifically, the placing portion 211 may be in contact with at least a portion of the rear surface of the first metal plate 221 and the second metal plate 222. For example, as shown in FIG. 6, the placing portion 211 may be in contact with the entire rear surface of the first metal plate 221 or the second metal plate 222 to maximize the bonding area between the main frame 210 and the metal plates 221, 222.

Also, the placing portion 211 may be in contact with at least a portion of the side surfaces of the first metal plate 221 and the second metal plate 222. Moreover, the placing portion 211 may be in contact with the entire side surfaces of the first metal plate 221 and the second metal plate 222.

For example, as shown in FIG. 4, the placing portion 211 may be in contact with a second side surface 232, a third side surface 233 and a fourth side surface 234 of the first metal plate 221. In addition, the placing portion 211 may be in contact with a second side surface 242 and a fourth side surface 244 of the second metal plate 222.

Figure 7:
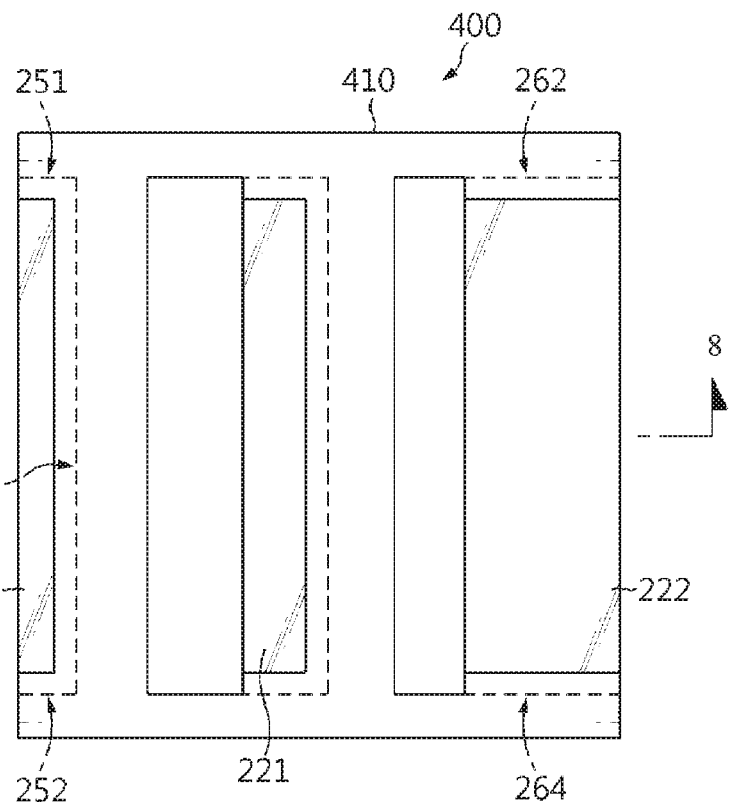
FIG. 7 is a front view schematically showing a bus bar according to another embodiment of the present disclosure.
Figure 8:
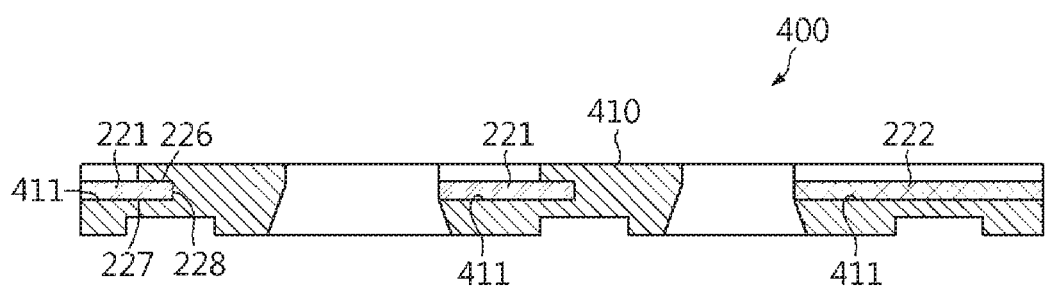
FIG. 8 is a cross-sectioned view showing an example of the cross section, taken along the line 8-8 of FIG. 7.

FIG. 7 is a front view schematically showing a bus bar according to another embodiment of the present disclosure. In addition, FIG. 8 is a cross-sectioned view showing an example of the cross section, taken along the line 8-8 of FIG. 7. However, in FIG. 7, a portion of the metal plate buried in the main frame is depicted with dotted lines for convenience of explanation.

Referring to FIGS. 7 and 8, in the bus bar 400 according to another embodiment of the present disclosure, the placing portion 411 may be configured to be in contact with a portion of the front surface of the first metal plate 221 and the second metal plate 222.

At this time, if the placing plate 411 for mounting the first metal plate 221 or the second metal plate 222 is in contact with the entire front surface of the first metal plate 221 or the second metal plate 222, the electrode lead contacted and connected to the front surface of the first metal plate 221 or the second metal plate 222 is not easily contacted or connected to the metal plate, and thus it is preferable that the placing portion 411 is formed to be in contact with a portion of the front surface of the first metal plate 221 and the second metal plate 222. For example, the placing portion 411 may be formed to be in contact with 10% to 50% of the entire front surface of the first metal plate 221 and the second metal plate 222.

In particular, if the first metal plate 221 and the second metal plate 222 are formed in a plate form standing vertically, the first metal plate 221 and/or the second metal plate 222 may be configured to be inserted into the placing portion 411 so that at least one of a top end 251, a bottom end 252 and side ends 253 thereof is covered.

For example, as shown in FIGS. 7 and 8, the placing portion 411 may be formed to cover the front surface 226, the rear surface 227 and the side surface 228 of the top end 251, the bottom end 252 and the side end 253 of the first metal plate 221. Also, the placing portion 411 may be formed to cover the front surface, the rear surface and the side surface of the top end 262 and the bottom end 264 of the second metal plate 222. The bus bar 400 according to this configuration is configured such that a portion of the main frame 410 covers the front surface, the rear surface and the side surface of the first metal plate 221 or the second metal plate 222, thereby effectively preventing the metal plate from being separated from the bus bar due to an external impact or the like.

However, when the first metal plate 221 and the second metal plate 222 are mounted to the main frame 210, the present disclosure is not limited to the above manner, and the first metal plate 221 and the second metal plate 222 may be mounted to the main frame 210 in various forms.

In addition, the front surface of the first metal plate 221 or the second metal plate 222 exposed to the outside is not protruded forward further, based on the front surface of the main frame 410 exposed to the outside, but may be positioned on the same plane or to be recessed rearward.

For example, as shown in FIG. 8, the front surface of the first metal plate 221 exposed to the outside is recessed rearward, based on the front surface of the main frame 410 exposed to the outside.

Thus, according to this configuration of the present disclosure, the bus bar 400 prevents the outwardly protruding metal plate from interfering with an external object, and thus it is possible to prevent the metal plate from improperly contacting an external object and being damaged. Also, it is possible to reduce the space occupied by the bus bar 400 in the battery module 300 by reducing the thickness of the bus bar 400 in the front and rear direction.

Moreover, the bus bar 400 may be configured such that the electrode leads 111, 112 may be located parallel to the front surface of the main frame 410 exposed to the outside or be recessed rearward even though the electrode leads 111, 112 are contacted and connected to the exposed front surfaces of the first metal plate 221 and the second metal plate 222.

According to this configuration of the present disclosure, it is possible to prevent the first electrode lead 111 or the second electrode lead 112 coupled to the bus bar 400 from interfering with an external object. Thus, in this case, it is possible to easily assemble the battery module 300, to prevent the electrode leads 111, 112 from improperly contacting an external conductive object, and also to prevent the electrode lead from being damaged due to the collision with an external object.

Referring to FIGS. 5 and 6 again, the first metal plate 221 and the second metal plate 222 may be formed by plastic working using a press. The plastic working by a press may be performed in a way that the outer shape of the metal plate is formed by slowly pressing a target by using a forging press. This method is advantageous in that there is no noise or vibration and no pore is formed in the metal. Thus, according to this configuration of the present disclosure, the first metal plate 221 and the second metal plate 222 may be formed thinly and tightly. In particular, in this case, since no pore is formed in the metal plate, it is possible to prevent the metal plate from being damaged during a work such as laser welding in which a high temperature is applied.

Also, the main frame 210 may be configured such that the placing portion 211 and the first metal plate 221 or the second metal plate 222 are closely adhered to each other by casting. Here, the casting may be, for example, die casting, and the die casting may be a method of melting a metal material by heating and then injecting the metal material into a mold with a desired shape to make a product. If the main frame 210 is made by the casting, a complicated structure may be precisely formed without performing additional finishing operations, and a process for reducing the weight of parts such as slimming may be easily performed. In particular, if an explosive casting method is used, a high-quality main frame 210 having reduced pores in the metal may be formed. However, when the main frame of the present disclosure is made by casting, the present disclosure is not limited to these specific casting methods.

In addition, as shown in FIG. 6, a portion 225 where the placing portion 211 of the main frame 210 and the first metal plate 221 are in direct contact with each other may be configured such that a partial metal of the first metal plate 221 and a partial metal of the main frame 210 are melted in mixture and bonded to each other.

The melted and bonded portion 225 may be formed as the main frame 210 in a high temperature state comes into contact with the first metal plate 221 when the main frame 210 is cast in a state where the first metal plate 221 is interposed. That is, at the bonded portion 225 of the first metal plate 221 and the main frame 210, a partial metal of the first metal plate 221 and a partial metal of the main frame 210 are mixed with each other, and then the mixed portion becomes solidified to bond the first metal plate 221 and the main frame 210.

Thus, according to this configuration of the present disclosure, the first metal plate 221 and the main frame 210 may be reliably coupled to each other with a high bonding force by compensating for the deterioration of bonding force generated when the metal materials of the first metal plate 221 and the main frame 210 are different from each other.

In particular, the portion 225 of the first metal plate 221, closely adhered to the placing portion 211, may be instantly heated and melted while being in contact with the thermally melted metal material of the main frame 210 during the casting process, and then be bonded to the main frame 210. Alternatively, the portion of the first metal plate 221 closely adhered to the placing portion 211 may be instantly heated and melted using a heater and then bonded to the main frame 210. However, the present disclosure is not necessarily limited to the above heating method, and various heating methods may be used for melting and bonding.

Further, similar to the first metal plate 221 described above, the portion of the second metal plate 222 closely adhered to the placing portion 211 of the main frame 210 may also be melted and bonded to the main frame 210 in a state where the metal of the second metal plate 222 and the metal of the main frame 210 are mixed with each other.

Thus, according to this configuration of the present disclosure, the deterioration of the bonding force caused when the second metal plate 222 and the main frame 210 have different metal materials is compensated, and thus the second metal plate 222 and the main frame 210 may be reliably coupled with a high bonding force.

Also, the main frame 210 formed by casting may have at least one hole formed in the placing portion 211. In addition, the first metal plate 221 and the second metal plate 222 may have at least one protrusion having a shape corresponding to the hole. In particular, the hole of the main frame 210 may be coupled in a state where the protrusion of the first metal plate 221 or the second metal plate 222 is inserted therein through the casting process.

Thus, according to this configuration of the present disclosure, the coupling structure of the protrusion and the hole may more firmly fix the coupling state of the main frame 210 and the first metal plate 221 or the second metal plate 222.

Further, the coupling structure of the protrusion and the hole may prevent the first metal plate 221 and the second metal plate 222 from moving when the first metal plate 221 and the second metal plate 222 are welded and coupled to the electrode leads or when the battery module 300 is being moved or used.

Referring to FIGS. 5 and 6 again, the main frame 210 may have at least one hole 230 formed therein. Further, the hole 230 may be formed to penetrate the main frame 210 in the front and rear direction. More specifically, the hole 230 may be formed in a shape corresponding to an end surface in the direction in which the first electrode lead 111 or the second electrode lead 112 protrudes. Thus, according to this configuration of the present disclosure, the first electrode lead 111 or the second electrode lead 112 may be easily inserted through the hole 230 without interference, thereby improving manufacturing efficiency.

Also, the hole 230 may be formed to be in contact with one side of the first metal plate 221 or the second metal plate 222 or at least in proximity with one side of the first metal plate 221 or the second metal plate 222.

For example, as shown in FIG. 5, the hole 230 may be formed in contact with one side of the first metal plate 221 or the second metal plate 222. In this case, the hole 230 may be configured such that one side surface of the first metal plate 221 or the second metal plate 222 is exposed to the hole 230. In this case, the extension length for the first electrode lead 111 or the second electrode lead 112 to contact the first metal plate 221 and the second metal plate 222 may be further minimized, and it is advantageous to for preventing the electrode lead from being broken or disconnected due to an external impact.

Figure 9:
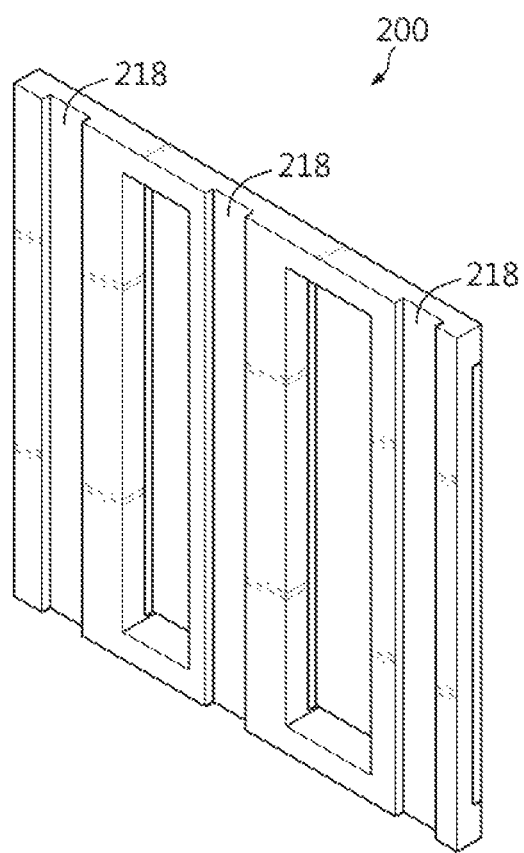
FIG. 9 is a rear view showing an example of a rear surface of the bus bar of FIG. 4.

FIG. 9 is a rear view showing an example of a rear surface of the bus bar of FIG. 4.

Referring to FIGS. 4 and 9, the main frame 210 may be configured to have at least one recessed portion 218 formed at the rear surface thereof. Specifically, the recessed portion 218 may be shaped to avoid interference with other components of the battery module 300, and, for example, the recessed portion 218 may be formed with a stepped structure where a partial surface of the main frame 210 is recessed forwardly.

Also, the recessed portion 218 may be formed to extend from the top end to the bottom end. For example, as shown in FIG. 9, three recessed portions 218 may be formed at the rear surface of the main frame 210 to be recessed to the front of the main frame 210. For example, the bus bar 200 may avoid interference with components protruding to the front of the secondary battery 100 of the battery module 300, by forming the recessed portion 218.

Thus, according to this configuration of the present disclosure, by forming the recessed portion 218 at the bus bar 200, it is possible to reduce the weight of the battery module 300 and reduce an unnecessary volume of the internal structure, thereby enabling to manufacture a more compact battery module 300.

Figure 10:
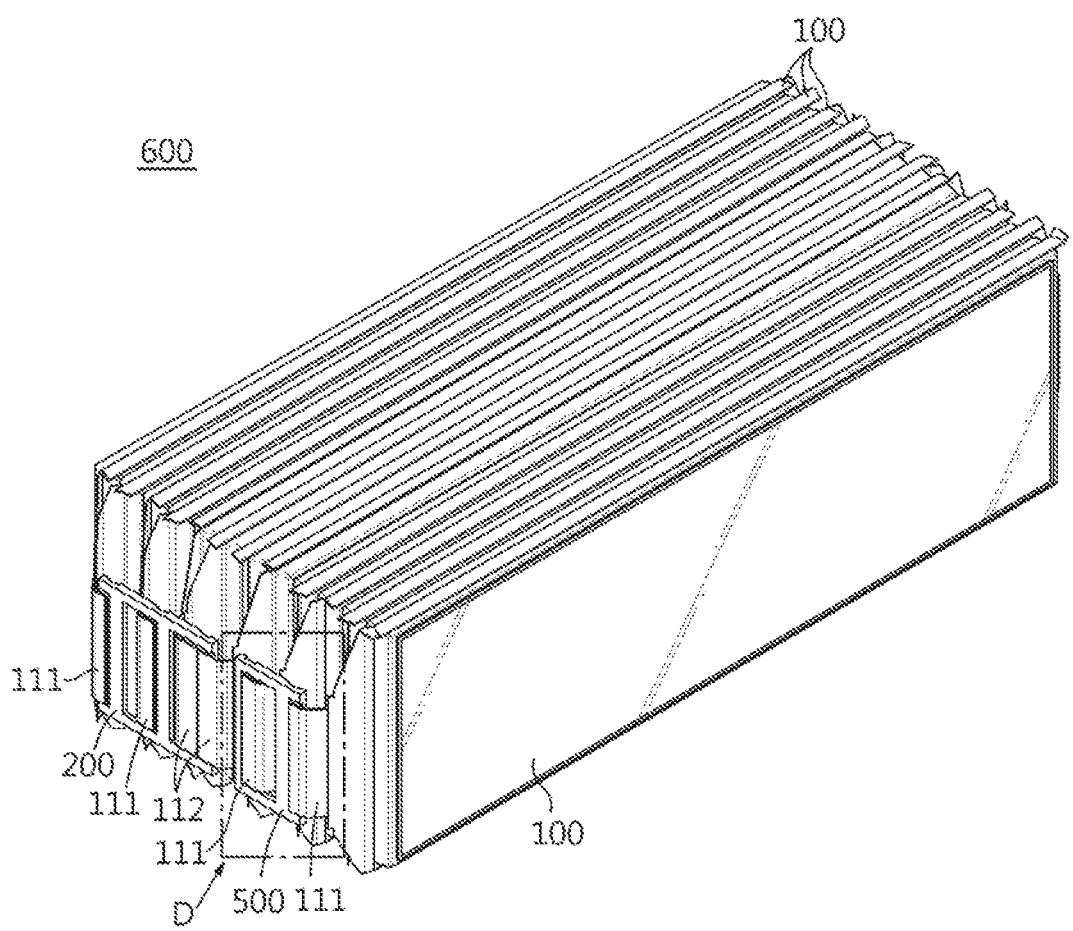
FIG. 10 is a perspective view schematically showing components of a battery module according to another embodiment of the present disclosure.
Figure 11:
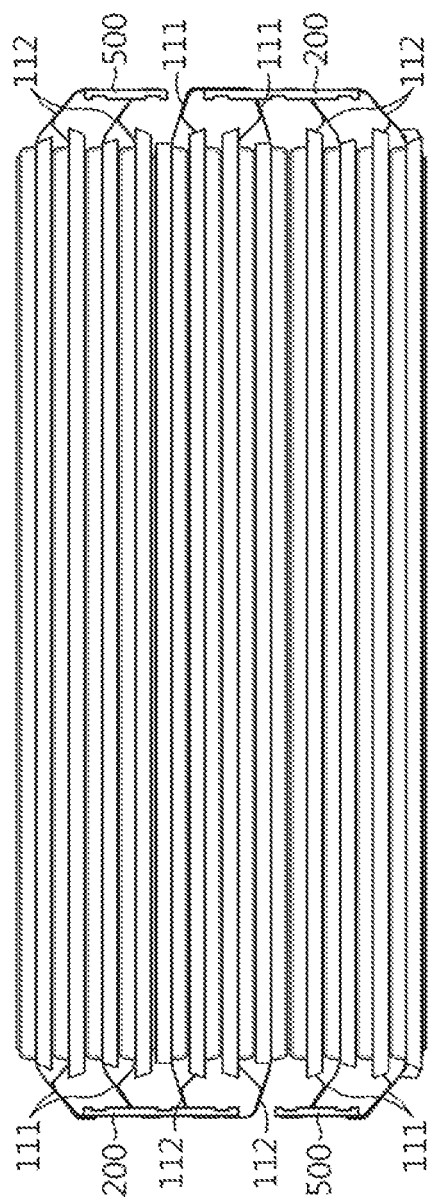
FIG. 11 is a plane view schematically showing components of the battery module according to another embodiment of the present disclosure.

FIG. 10 is a perspective view schematically showing components of a battery module according to another embodiment of the present disclosure. In addition, FIG. 11 is a plane view schematically showing components of the battery module according to another embodiment of the present disclosure. Here, the features similar or identical to those of the former embodiment will not be described in detail, and features different from the former embodiment will be described in detail.

Referring to FIGS. 10 and 11, a battery module 600 according to another embodiment of the present disclosure may include a bus bar 500 having a different shape from the bus bar 200 included in the battery module 300 of FIG. 1.

In detail, the battery module 600 may include another type of bus bar 500 that contacts the first electrode leads 111 or the second electrode leads 112 to electrically connect the secondary batteries 100 in parallel.

In addition, the battery module 600 may include both of the bus bar 200 that contacts both the first electrode leads 111 and the second electrode leads 112 of the secondary batteries 100 to electrically connect the secondary batteries 100 in series and another type of bus bar 500 that contacts the first electrode leads 111 or the second electrode leads 112 to electrically connect the secondary batteries 100 in parallel.

For example, as shown in FIGS. 10 and 11, when the first electrode lead 111 and the second electrode lead 112 of the secondary battery 100 are respectively protruded forward and backward, two bus bars 200 and two another type of bus bars 500 may be formed at the front and rear sides of the battery module 600.

Figure 12:
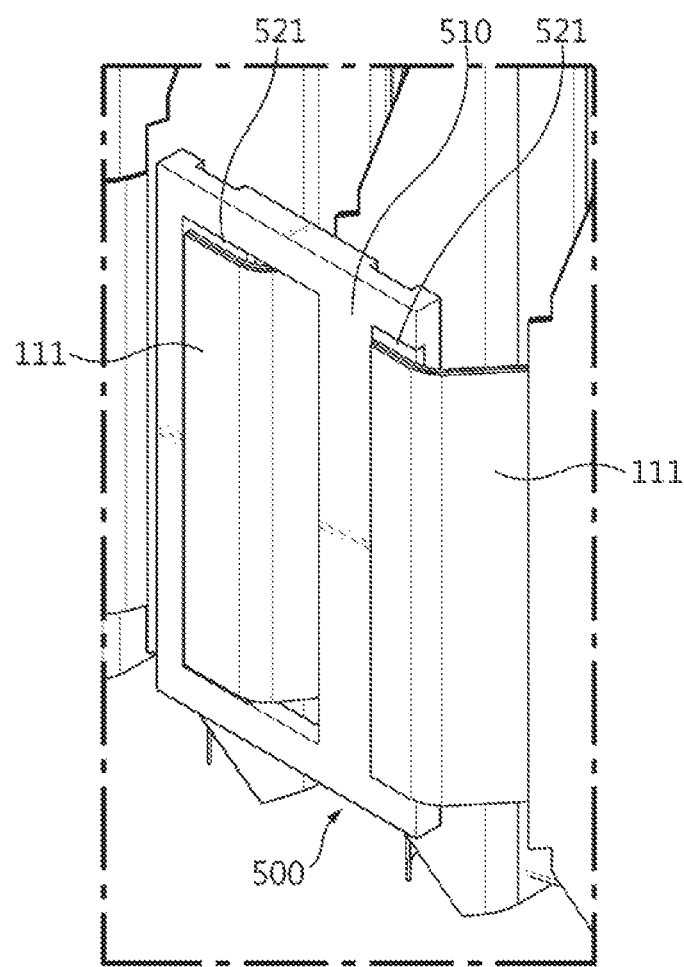
FIG. 12 is an enlarged perspective view showing a portion D of the battery module of FIG. 10.
Figure 13:
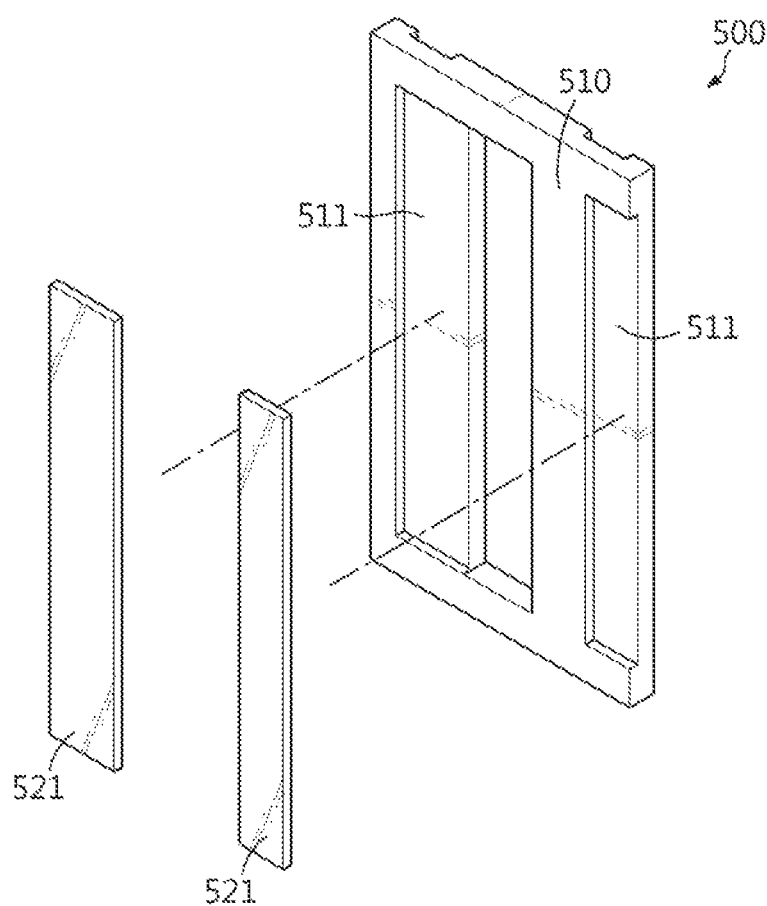
FIG. 13 is an exploded perspective view showing various components of another example of a bus bar employed at the battery module of FIG. 10 are separated.

FIG. 12 is an enlarged perspective view showing a portion D of the battery module of FIG. 10. In addition, FIG. 13 is an exploded perspective view showing various components of another example of a bus bar employed at the battery module of FIG. 10 are separated.

Also, the bus bar 500 may include a main frame 510 and at least two metal plates 521.

More specifically, the bus bar 500 may include at least one third metal plate 521 contacted and connected to the first electrode leads 111 or the second electrode leads 112 of at least two secondary batteries 100. For example, as shown in FIG. 12, the bus bar 500 includes two third metal plates 521 contacted and connected to the first electrode leads 111 of two secondary batteries 100.

In particular, the third metal plate 521 may include a different kind of metal material from the main frame 510. Accordingly, according to this configuration of the present disclosure, since the bus bar 500 includes a metal plate having a different kind of metal material from the main frame 510, it is possible to prevent that different kinds of metals are bonded when the bus bar 500 is coupled to the electrode lead made of a different kind of metal material from the main frame 510.

For example, as shown in FIG. 12, the bus bar 500 may include two third metal plates 521, and each of the third metal plates 521 may be contacted and connected to two first electrode leads 111 that partially overlap with each other.

Thus, according to this configuration of the present invention, the bus bar 500 may electrically connect four secondary batteries 100 in parallel.

In addition, as shown in FIG. 13, the main frame 510 may have placing portions 511 formed at a front surface thereof. Further, the placing portion 511 may be configured such that the third metal plate 521 is placed thereon.

For example, the placing portion 511 may be formed to be recessed with a size corresponding to the third metal plate 521. In this case, the third metal plate 521 may be stably coupled to the main frame 510 without being easily deviated due to an external impact.

Also, the main frame 510 may have at least one hole. For example, as shown in FIG. 13, one hole may be formed at one side of the placing portion 511.

FIG. 14 is a schematic front sectioned view for illustrating an example of a method for manufacturing a bus bar of the battery module according to an embodiment of the present disclosure.

Referring to FIG. 14 along with FIG. 4, a method for manufacturing the bus bar 200 according to the present disclosure includes the following steps.

First, in a process (a), a first metal plate 221 and a second metal plate 222 shaped by plastic working using a press may be prepared.

In addition, in a process (b), the prepared first metal plate 221 and the prepared second metal plate 222 may be mounted and fixed in a mold 400.

Also, in a process (c), a molten metal 215 may be injected into an injection hole 410 formed in the mold 400 so as to be coupled to at least a portion of the first metal plate 221 and the second metal plate 222, and then, the injected molten metal 215 is cooled and solidified to cast the main frame 210.

At this time, the heat of the injected molten metal 215 may come into contact with a portion of the first metal plate 221 and the second metal plate 222 mounted in the mold 400 so that the heat is conducted to the contacted outer surface of the first metal plate 221 and the second metal plate 222.

In this case, the portions of the first metal plate 221 and the second metal plate 222, which are in contact with the injected molten metal 215, may be melted and bonded in a state where a part of the metal is melted by the conducted heat and mixed with the injected molten metal 215. Thus, according to this configuration of the present disclosure, the first metal plate 221 and the second metal plate 222 may be coupled to the main frame 210 with a strong coupling force.

Finally, in a process (d), the main frame 210 solidified in a state of being coupled to the first metal plate 221 and the second metal plate 222 is taken out of the mold 400, thereby completely manufacturing the bus bar 200.

In addition, a battery pack according to the present disclosure may include one or more battery modules according to the present disclosure. Further, the battery pack according to the present disclosure may further include, in addition to the battery module, a pack case for accommodating the battery module 400, various devices for controlling charge and discharge of the battery module 400 such as a battery management system (BMS), a current sensor, a fuse and the like.

In addition, the battery pack according to the present disclosure may be applied to a vehicle such as an electric vehicle or a hybrid electric vehicle. In other words, the vehicle according to the present disclosure may include the battery pack of the present disclosure.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module, in particular, the present disclosure may be applied to industries associated with a battery pack configured using the battery modules and a vehicle driven by the battery pack, for example an electrical vehicle.

What is claimed is:

1. A battery module, comprising:
a plurality of pouch-type secondary batteries configured to respectively have a first electrode lead and a second electrode lead and arranged to be stacked in at least one direction; and
a bus bar made of an electrically conductive material and contacted to at least two of the first and second electrode leads of the secondary batteries to electrically connect the secondary batteries to each other,
wherein the bus bar includes:
at least two metal plates contacted and connected to at least two of the first electrode leads and the second electrode leads of at least two secondary batteries; and
a main frame coupled to the metal plates so that the metal plates are at least partially exposed to the outside, the main frame comprising:
a rear surface facing the plurality of pouch-type secondary batteries and a front surface opposite the rear surface;
a placing portion comprising at least two recesses formed in the front surface of the main frame, the at least two metal plates respectively retained in the at least two recesses and contacting a front surface of a respective recess; and
a hole in each of the at least two recesses, the at least two of the first and second electrode leads passing through a respective hole,
wherein at least one of the metal plates has a different kind of metal material from a material of the main frame.

2. The battery module according to claim 1, wherein the at least two metal plates include:
a first metal plate contacted and connected to the first electrode lead of at least one secondary battery; and
a second metal plate contacted and connected to the second electrode lead of at least one secondary battery.

3. The battery module according to claim 2, wherein the first metal plate is made of a same material as the first electrode lead of the secondary battery to which the first metal plate is contacted and connected, and
wherein the second metal plate is made of a same material as the second electrode lead of the secondary battery to which the second metal plate is contacted and connected.

4. The battery module according to claim 3, wherein the first metal plate, the second metal plate or the main frame includes nickel, copper, aluminum, lead or tin.

5. The battery module according to claim 1, wherein an outwardly exposed front surface of the first metal plate or the second metal plate is recessed from the front surface of the main frame.

6. The battery module according to claim 1, wherein the first metal plate and the second metal plate are embedded in the main frame, and
wherein a portion of a top edge, bottom edge and a side edge of a front surface of the first metal plate and the second metal plate are covered by the main frame.

7. The battery module according to claim 1, wherein the first metal plate and the second metal plate have a plate form standing in an upper and lower direction, and
wherein the first metal plate and the second metal plate are inserted into the placing portion to cover a portion of a front surface, a rear surface and a side surface of at least one of a top end, a bottom end and a side end of the first metal plate and the second metal plate, respectively.

8. The battery module according to claim 1, wherein the first metal plate and the second metal plate are shaped by means of plastic working, and
wherein the main frame is formed by casting so that the placing portion, the first metal plate and the second metal plate are closely adhered to each other.

9. The battery module according to claim 8, wherein a portion of the first metal plate closely adhered to the placing portion of the main frame is melted and bonded to the main frame in a mixed form of the metal of the first metal plate and a metal of the main frame, and
wherein a portion of the second metal plate closely adhered to the placing portion of the main frame is melted and bonded to the main frame in a mixed form of the metal of the second metal plate and the metal of the main frame.

10. The battery module according to claim 1, wherein one side of the first metal plate and the second metal plate extend to a respective hole.

11. The battery module according to claim 1, wherein at least one recessed portion recessed to the front of the main frame is formed at the rear surface of the main frame.

12. A battery pack, comprising a battery module according to claim 1.

13. A vehicle, comprising a battery pack according to claim 12.

14. A bus bar, which is in contact with at least two of first electrode leads and second electrode leads of secondary batteries to electrically connect the secondary batteries, the bus bar comprising:
at least two metal plates contacted and connected to at least two of the first electrode leads and the second electrode leads of at least one secondary battery; and
a main frame coupled to the metal plate so that the metal plate is at least partially exposed to the outside, the main frame comprising:
a rear surface facing a plurality of pouch-type secondary batteries and a front surface opposite the rear surface;
a placing portion comprising at least two recesses formed in the front surface of the main frame, the at least two metal plates respectively retained in the at least two recesses and contacting a front surface of a respective recess; and
a hole in each of the at least two recesses, the at least two of the first and second electrode leads passing through a respective hole, wherein at least one of the metal plates has a different kind of metal material from a material of the main frame.

* * * * *